(12) United States Patent
Campbell

(10) Patent No.: US 10,695,938 B2
(45) Date of Patent: Jun. 30, 2020

(54) SAFETY APPARATUS FOR PROTECTING AN OPERATOR OF AN ELECTRICALLY POWERED SAW

(71) Applicant: SCOTT AUTOMATION & ROBOTICS PTY LIMITED, Silverwater, New South Wales (AU)

(72) Inventor: Clyde Mark Campbell, Mosman (AU)

(73) Assignee: Scott Automation & Robotics Pty Ltd., Silverwater, New South Wales (AU)

( * ) Notice: Subject to any disclaimer, the term of this patent is extended or adjusted under 35 U.S.C. 154(b) by 238 days.

(21) Appl. No.: 15/511,863

(22) PCT Filed: Sep. 18, 2015

(86) PCT No.: PCT/AU2015/050561
§ 371 (c)(1),
(2) Date: Mar. 16, 2017

(87) PCT Pub. No.: WO2016/041020
PCT Pub. Date: Mar. 24, 2016

(65) Prior Publication Data
US 2017/0282397 A1  Oct. 5, 2017

(30) Foreign Application Priority Data

Sep. 18, 2014  (AU) .................. 2014903735

(51) Int. Cl.
*A22C 17/00* (2006.01)
*B27B 13/14* (2006.01)
(Continued)

(52) U.S. Cl.
CPC .......... *B27B 13/14* (2013.01); *A22C 17/0006* (2013.01); *B27B 5/38* (2013.01);
(Continued)

(58) Field of Classification Search
CPC ....... A22C 17/0006; B27B 5/38; B27B 13/14; B27G 19/06; B27G 19/00; F16P 3/12;
(Continued)

(56) References Cited

U.S. PATENT DOCUMENTS 2,286,589 A   6/1942  Tannewitz
2,311,268 A   2/1943  Tannewitz
(Continued)

FOREIGN PATENT DOCUMENTS

CN         86104198        3/1987
CN         1210500         3/1999
(Continued)

OTHER PUBLICATIONS

International Preliminary Report on Patentability for International Application No. PCT/AU2015/050561 dated Mar. 30, 2017 (9 pages).
(Continued)

*Primary Examiner* — Kenneth E Peterson
*Assistant Examiner* — Liang Dong
(74) *Attorney, Agent, or Firm* — Merchant & Gould P.C.

(57) ABSTRACT

There is provided an emergency braking apparatus for stopping travel of the blade of an electrically powered saw of the type incorporating a cutting table through which the blade of the saw passes during a cutting operation. The apparatus comprises a braking jaw and a movable jaw spaced apart from the braking jaw for reception of the blade of the saw between the braking jaw and the movable jaw. The apparatus also comprises a driver for driving the movable jaw from a retracted position into contact with a side face of the blade to force an opposite side the blade against the braking jaw and thereby clamp the blade between the braking jaw and the movable jaw, a pressure chamber for holding a fluid at a predetermined pressure, and an actuator
(Continued)

operable in response to an emergency braking signal to release the pressurised fluid in the pressure chamber to drive the driver against the movable jaw whereby the movable jaw is driven into contact with the side face of the blade.

20 Claims, 4 Drawing Sheets

(51) Int. Cl.
| | |
|---|---|
| *F16P 3/14* | (2006.01) |
| *F16P 7/00* | (2006.01) |
| *B27G 19/06* | (2006.01) |
| *F16P 3/12* | (2006.01) |
| *B27B 5/38* | (2006.01) |

(52) U.S. Cl.
CPC ............... *B27G 19/06* (2013.01); *F16P 3/12* (2013.01); *F16P 3/14* (2013.01); *F16P 7/00* (2013.01)

(58) Field of Classification Search
CPC .... F16P 3/14; B23D 59/001; F16D 2127/001; F16D 2127/008; F16D 2129/02; F16D 2121/04; F16D 55/2245; F16D 2127/002; F16D 2127/004; F16D 2127/005; F16D 2121/18; F16D 2125/70; F16D 2125/18; B60T 13/10; B60T 13/12; B60T 13/14; B60T 13/268; A22B 5/0017
See application file for complete search history.

(56) References Cited

U.S. PATENT DOCUMENTS

| | | | | |
|---|---|---|---|---|
| 2,500,321 | A | | 3/1950 | Petersen |
| 2,607,373 | A | | 8/1952 | Crane |
| 2,736,348 | A | | 4/1954 | Nelson |
| 3,372,775 | A | * | 3/1968 | Beller ................ F16D 55/2255 |
| | | | | 188/196 BA |
| 3,690,417 | A | * | 9/1972 | Airheart ................ F16D 55/224 |
| | | | | 188/71.8 |
| 4,049,324 | A | * | 9/1977 | Cermak ................ B60T 13/683 |
| | | | | 188/3 R |
| 4,117,752 | A | | 10/1978 | Yoneda |
| 4,558,614 | A | | 12/1985 | Harris |
| 4,766,790 | A | | 8/1988 | Harris |
| 5,031,511 | A | * | 7/1991 | Villata ................ F16D 65/84 |
| | | | | 92/128 |
| 5,272,946 | A | | 12/1993 | McCullough et al. |
| 6,991,073 | B2 | * | 1/2006 | Macke ................ F16C 29/02 |
| | | | | 188/73.1 |
| 2002/0170399 | A1 | | 11/2002 | Gass et al. |
| 2002/0170400 | A1 | | 11/2002 | Gass |
| 2008/0245200 | A1 | | 10/2008 | Campbell |
| 2010/0213018 | A1 | | 8/2010 | Gass et al. |
| 2011/0167974 | A1 | | 7/2011 | Jan et al. |
| 2012/0090439 | A1 | | 4/2012 | Butler |
| 2012/0137848 | A1 | | 6/2012 | Gass |

FOREIGN PATENT DOCUMENTS

| | | | |
|---|---|---|---|
| CN | 100343030 | | 10/2007 |
| EP | 3 366 400 | | 8/2018 |
| FR | 1142598 | | 1/1956 |
| GB | 829360 | | 3/1960 |
| JP | H09155789 | * | 6/1997 |
| SU | 471194 | | 4/1973 |
| SU | 176984 | | 7/1975 |
| SU | 1526990 | | 12/1989 |
| SU | 1717347 | | 3/1992 |
| WO | 2007009172 | | 1/2007 |

OTHER PUBLICATIONS

European Search Report for EP Application No. 1584191.9 dated Mar. 26, 2018 (8 pages).
International Search Report for International Application No. PCT/AU2015/050561 dated Oct. 122, 2015 (11 pages).
Chinese Office Action for corresponding CN Application No. 201580050345.0 dated Dec. 5, 2018 (14 pages)—Translation included.
Canadian Examination Report for corresponding CA Application No. 2960867 dated Nov. 26, 2018 (6 pages).
Tang et al. "High Alloy Steel Wire" Metallurgical Industry Press May 31, 2008, 3 pages, Translation only.

* cited by examiner

SAFETY APPARATUS FOR PROTECTING AN OPERATOR OF AN ELECTRICALLY POWERED SAW This application is a National Stage Application of PCT/AU2015/050561, filed 18 Sep. 2015, which claims benefit of Serial No. 2014903735, filed 18 Sep. 2014 in Australia and which applications are incorporated herein by reference. To the extent appropriate, a claim of priority is made to each of the above disclosed applications.

FIELD OF THE INVENTION

The present invention relates to safety apparatus for stopping the travel of the blade of an electrically powered saw to protect a user of the saw. The apparatus finds particular application to saws commonly used for the processing of meat and/or animal carcasses.

BACKGROUND OF THE INVENTION

Band saws are commonly used to cut carcasses and meat sections in the red meat industry as part of the meat processing stage. When using a band saw, the operator generally physically holds the carcass or meat section either side of the band saw blade and drives the meat into the blade to effect the cutting operation. This inherently places the operator at risk of contacting the blade in the event of slipping or, for example, as a result of inattention.

While guards can be used to cover the blade, a region of the blade remains exposed to the operator. For larger cuts of meat and carcasses, a significant section of the blade must remain exposed. Contact with the blade can result in serious injury including loss of digits and worse. Once an operator recognizes they have come into contact with the blade and takes corrective action, there is nevertheless a time delay involved in which significant injury can be sustained from the blade. Similarly, even if an emergency stop button is activated, the blade of the saw may continue to move before being brought to a stop.

Injuries to operators can be debilitating for the operator, distressing to all involved, and costly to employers in terms of downtime, loss of productivity and associated rehabilitation of the employee.

SUMMARY OF THE INVENTION

The present invention provides an apparatus for stopping the travel of the blade of an electrically powered saw in an emergency situation such as when the operator of the saw comes into contact with the blade of the saw or is otherwise at risk of coming into contact with the blade.

In an aspect of the invention there is provided an emergency braking apparatus for stopping travel of the blade of an electrically powered saw of the type incorporating a cutting table through which the blade of the saw passes during a cutting operation, the apparatus comprising:

a braking jaw;

a movable jaw spaced apart from the braking jaw for reception of the blade of the saw between the braking jaw and the movable jaw;

a driver for driving the movable jaw from a retracted position into contact with a side face of the blade to force an opposite side the blade against the braking jaw and thereby clamp the blade between the braking jaw and the movable jaw;

a pressure chamber for holding a fluid at a predetermined pressure; and an actuator operable in response to an emergency braking signal to release the pressurised fluid in the pressure chamber to drive the driver against the movable jaw for driving the movable jaw into said contact with the side face of the blade.

In another aspect of the invention there is provided a method for the emergency braking of a blade of an electrically powered saw of the type incorporating a cutting table through which the blade of the saw passes during a cutting operation, the method comprising:

providing a braking apparatus comprising a braking jaw and a movable jaw spaced apart from the braking jaw, the blade of the saw passing between the braking jaw and the movable jaw, and the apparatus further including a driver for driving the movable jaw from a retracted position into contact with a side face of the blade to force an opposite side the blade against the braking jaw and thereby clamp the blade between the braking jaw and the movable jaw, a pressure chamber for holding a fluid at a predetermined pressure, and an actuator operable to release the pressurised fluid from the pressure chamber; and operating the actuator in response to an emergency braking signal to release the pressurised fluid in the pressure chamber to drive the driver against the movable jaw and so drive the movable jaw into said contact with the side face of the blade to brake the blade.

Typically, the moveable jaw and the braking jaw are profiled to distort a portion of the blade sidewardly with respect to a longitudinal axis of the blade to effect the clamping of the blade. However, the moveable jaw and the braking jaw can be of any suitable shape or profile for clamping the blade of the saw to thereby stop the travel of the blade, and need not be profiled to distort the blade sidewardly to create a tortuous pathway for the blade in order to effect stopping of the blade.

Typically, the actuator is a solenoid actuator operable to release the pressurised fluid from the pressure chamber.

Typically, the solenoid actuator is a solenoid valve comprising a solenoid body and a valve member, and the solenoid is operable in response to the emergency braking signal to release the valve member for release of the pressurised fluid from the pressure chamber.

Typically, the valve member is a valve disc and the apparatus further includes a discharge port for directing the pressurised fluid from the pressure chamber to the driver, the valve member being arranged to control flow of the pressurised fluid from the pressure chamber to the discharge port.

Typically, the apparatus further comprises a pressure chamber housing in which the pressure chamber is defined and which houses the solenoid.

Typically, the driver is arranged for being linearly driven by the pressurised fluid from a resting position to a working position in which the moveable jaw is pressed against the side face of the blade.

Typically, the driver comprises a piston having a piston head and a piston rod, and the apparatus further comprises a fluid flow path for directing the pressurised fluid into contact with the piston head to drive the piston rod into the working position.

Typically, the apparatus also comprises a cylinder in which the piston head of the piston is disposed, and the piston rod of the piston projects from the cylinder to drive the clamping of the blade by the braking jaw and the movable jaw.

In particularly preferred embodiments, the piston rod of the piston projects from the cylinder and bears against the movable jaw.

In at least some embodiments, the apparatus can further comprise a guide housing into which the piston rods projects from the cylinder, and at least one guide rod for guiding movement of the moveable jaw into contact with the side face of the blade, wherein the one or more guide rods is/are slidably received by the guide housing.

Moreover, an apparatus embodied by the invention may also comprise biasing means arranged in the cylinder to bias the piston for return the retracted position from the working position of the piston upon the pressurised fluid being vented from acting on the driver.

Typically, the braking jaw is a stationary jaw retained in a fixed in position. However, embodiments may be provided in which both the braking jaw and the moveable jaw are arranged to be driven into contact with the blade upon operation of the actuator, such as by a linkage system or other suitable mechanism for driving the braking and movable jaws into contact with the blade from their respective retracted positions.

In still another aspect there is provided an electrically powered saw of the type incorporating a cutting table through which the blade of the saw passes during a cutting operation, the saw comprising an apparatus embodied by the invention for stopping travel of the blade in response to an emergency stopping braking signal, wherein the apparatus is arranged to clamp the blade when triggered by the emergency stopping signal.

The saw to which apparatus embodied by the invention may be fitted in use may, for instance, be selected from the group consisting of band saws and table saws. Most typically, the saw is a band saw.

Whilst an apparatus in accordance with the invention may be employed with saws for various cutting operations, the cutting operation will generally be the cutting of a meat carcass or a piece of meat into smaller pieces.

As will be appreciated, the use of an apparatus embodied by the invention may save operators from amputations or significantly lessen the seriousness of injury resulting from contact with the blade of the saw. Whilst saws to which an apparatus embodied by the invention has been fitted find particular application to the red meat processing industry, it will be understood that embodiments of the invention have broader application and the invention is not limited thereto.

Any publications mentioned in this specification are herein incorporated by reference. Any discussion of documents, acts, materials, devices, articles or the like which has been included in this specification is solely for the purpose of providing a context for the present invention. It is not to be taken as an admission that any or all of these matters form part of the prior art base or were common general knowledge in the field relevant to the present invention as it existed in Australia or elsewhere before the priority date of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers, integers or steps.

The features and advantages of methods of the present invention will become further apparent from the following detailed description of non-limiting embodiments together with the accompanying figures.

BRIEF DESCRIPTION OF THE ACCOMPANY DRAWINGS

DETAILED DESCRIPTION OF EXEMPLARY EMBODIMENTS OF THE INVENTION

Figure 1:
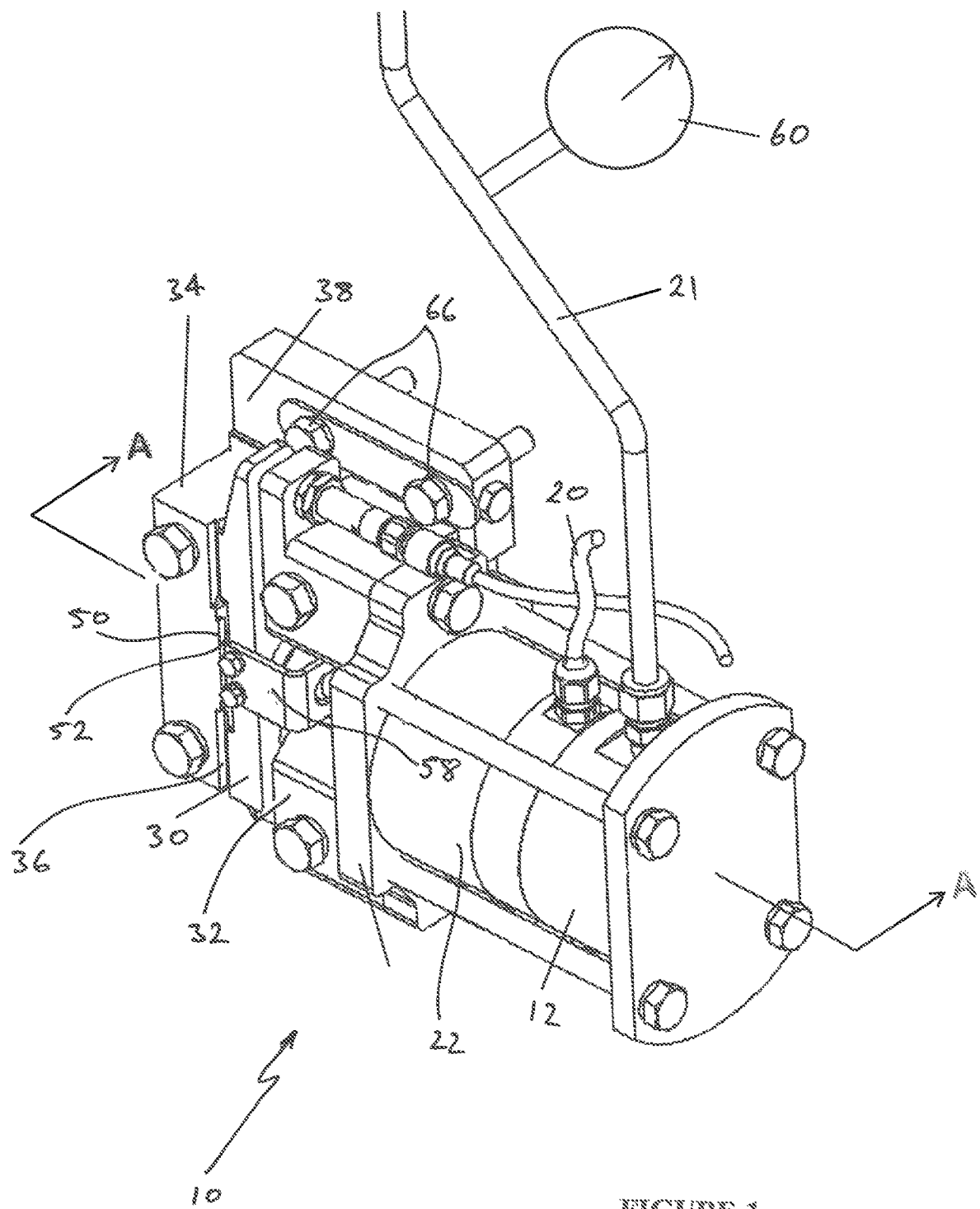
FIG. 1 is a perspective view of a braking apparatus embodied by the invention for stopping the travel of blade of an electrically powered saw as described herein.
Figure 2:
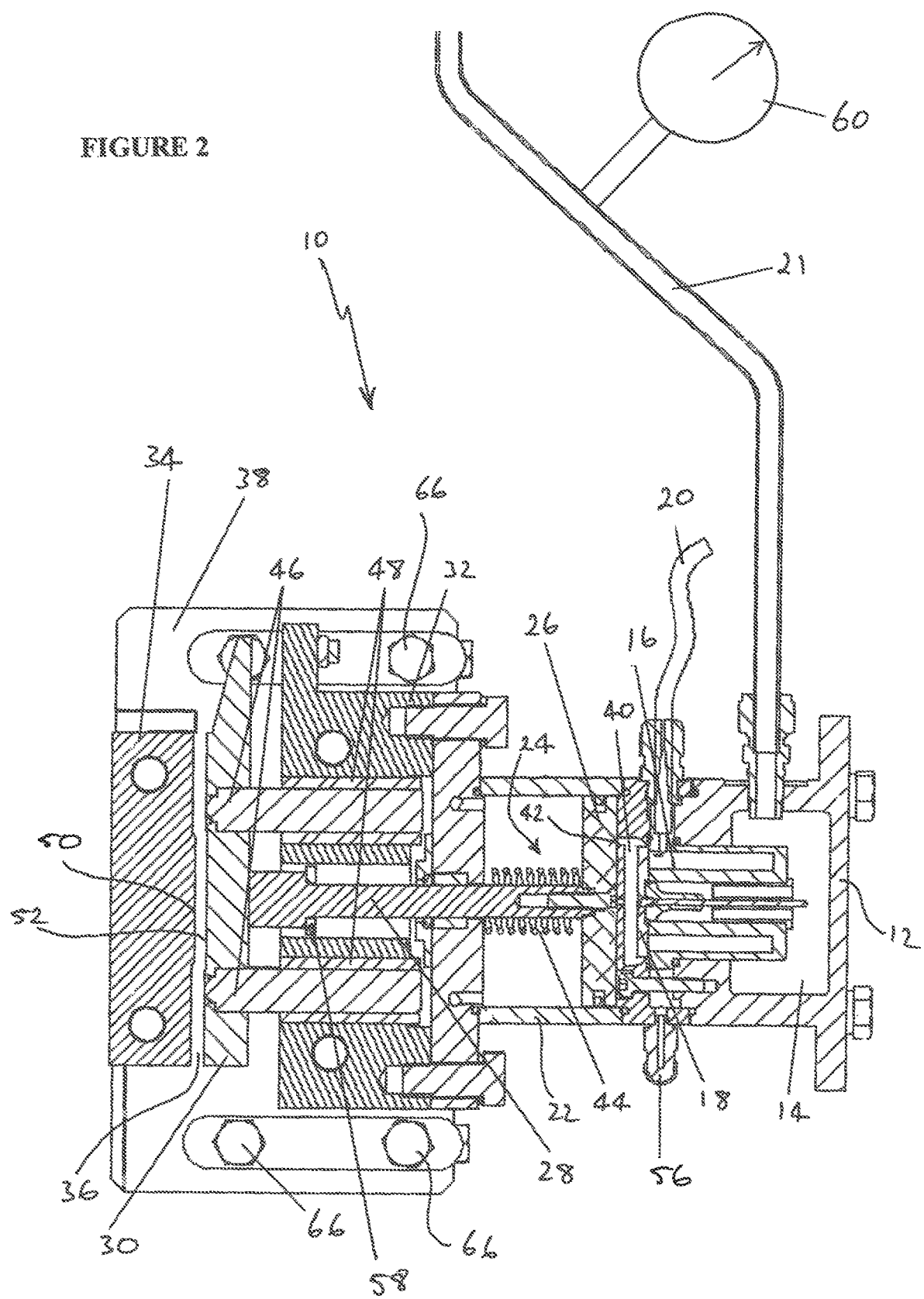
FIG. 2 is a longitudinal cross-sectional view taken through A-A of FIG. 1.

An emergency braking apparatus 10 embodied by the invention for stopping the travel of a blade of an electrically powered saw is shown in FIG. 1 and FIG. 2. As best shown in FIG. 2, the apparatus has a pressure chamber housing 12 in the form of a cylinder in which is defined a pressure chamber 14 for holding a fluid under pressure as described further below. A solenoid actuator 16 is housed by the cylinder 12 and is energised via the solenoid lead 20 in use. The solenoid actuator is a normally open solenoid valve with a plunger type valve member comprising a valve disc 18, and is operable in response to an emergency braking signal as further described below.

The fluid is fed into the pressure chamber 14 through a feed line 21 and the pressure chamber housing 12 is mounted to a piston cylinder 22 in which a driver in the form of a piston 24 is slidably arranged. The piston 24 has a piston head 26 disposed in the piston cylinder 22 and a piston rod 28 that projects from the piston cylinder and bears directly against a moveable jaw 30. As can also be seen, the piston cylinder is in turn mounted to guide housing 32 which receives the piston rod of the piston.

The moveable jaw 30 is spaced apart from a stationary braking jaw 34 forming a gap 36 for reception of the blade of the saw. A minimal tolerance is provided either side of the blade for travel of the blade between the moveable and fixed jaws 30 and 34 in normal usage of the saw. As also shown, the braking jaw 34 is bolted to a mount 38 of the apparatus 10 and so is retained in a fixed position by the mount 38.

When the apparatus is triggered by the emergency braking signal, the coil of the solenoid valve 16 is de-energised. As a result, the valve disk 18 of the solenoid is released and forced from its closed position by the pressurised fluid in the pressure chamber. This allows the pressurised fluid to flow from the pressure chamber 14 along a flow path indicated by the numeral 40 that is defined between the solenoid valve 16 and the piston 24 through a discharge port 42 into contact with the head 26 of the piston. The piston 24 is then linearly driven from a resting position by the pressurised fluid along the piston cylinder 22 to a working position against the operation of a biasing means in the form of an extension spring 44 located in the piston cylinder. The linear travel of the piston rod 28 along the piston cylinder in turn linearly drives the moveable jaw 30 from a retracted position into contact with a side face of the blade, forcing the opposite side of the blade against the braking jaw to fixedly clamp the blade between the movable and fixed jaws and so prevent further travel of the blade.

The movement of the moveable jaw 30 into contact with the blade of the saw under the action of the piston rod 28 is guided by the guide rods 46 each of which has one end connected to the movable jaw 30 and an opposite end slidably received in a respective bush 48 disposed in the guide housing 32 as shown in FIG. 2.

As further shown in FIG. 2, the moveable jaw 30 and the stationary braking jaw 34 are profiled to distort a section of the blade sidewardly with respect to a longitudinal axis of the blade to effect the clamping of the blade. More particularly, in the embodiment shown, the stationary braking jaw 34 has a protruding portion 50 aligned with a corresponding recessed portion 52 of the moveable jaw 30. The raised and recessed portions of the braking and moveable jaws define a tortuous path for the blade and upon triggering of the apparatus 10 by the emergency braking signal, the section of the blade contacted by the raised portion 50 of the braking jaw 34 is distorted sidewardly as the moveable jaw 30 is driven against the other side face of the blade, to thereby rapidly effect the clamping of the blade against the braking jaw 34 and so stop further travel of the blade. Typically, the clamping of the blade between the moveable and stationary braking jaws 30 and 34 by the braking apparatus 10 stopping the blade in response to the emergency braking signal is generally in the order of about 10-12 milliseconds or less. Further, the sideward bending distortion of the blade permanently deforms that section of the blade clamped between the raised and recess portions 50 and 52 of the braking and movable jaws 30 and 34, requiring replacement of the blade before further use of the saw.

In other embodiments, the braking jaw 34 and the moveable jaw may each have a substantially flat braking surface which is driven against the corresponding side face of the blade to effect the clamping of the blade with the operation of the solenoid actuator 16. The respective braking surface of each of the moveable and braking jaws may, for instance, be an essentially flat surface and/or be knurled or have other surface deformations or protruberances for assisting the clamping of the blade such as ribs or cranulations that are orientated transversely with respect to the direction of travel of the blade.

The control system controlling the operation of the apparatus generates the emergency braking signal and disables the saw motor upon the detection of the relevant emergency situation, and is configured for release of the blade by the clamping apparatus 10 after a nominal predetermined timeframe (e.g., 3 seconds).

To release the blade, the solenoid actuator 16 is re-energised via solenoid lead 20 in response to which the valve disk 18 is magnetically drawn back to its closed position to seal the fluid flow path 40. At the same time, fluid in the flow path 40 is vented through venting port 56 and the moveable jaw 30 returns to its resting position under the action of biasing spring 44 and a pull bracket 58 coupled to the piston rod 28. A feedback signal to the control system is provided by a proximity sensor when the sensor senses the moveable jaw is in its retracted position. Likewise, a pressure sensor 60 provides a feedback signal to the control system once the fluid in the pressure chamber 14 again builds to its predetermined operational pressure after a few seconds. Once the moveable jaw 30 has returned to its retracted position and the fluid pressure in the pressure chamber has reached the predetermined operational pressure, the clamping apparatus 10 is again primed to clamp a further blade in response to a further emergency braking signal from the control system.

In other embodiments, upon the solenoid actuator 16 being re-energised to release the blade, the fluid in the fluid flow path 40 is vented through the same inlet ports through which the fluid entered the fluid flow path in which case venting port can be sealed with a plug or not be provided.

Whilst in the embodiments described above the braking jaw 34 is fixed in position, other embodiments of the invention may be provided in which both the braking jaw 34 and the moveable jaw 30 are driven from a respective retracted position into contact with the corresponding side face of the blade of the saw. Such an embodiment is illustrated in FIG. 3.

In this embodiment, the piston rod 28 of the braking apparatus 70 is coupled to the braking jaw 34 and the movable jaw 30 via a linkage system 72 comprising first and second lever arms 74 and 76 joined together via a linking pivot arm 75 at pivots 78 and 80. As can be seen, the lever arms 74 and 76 are arranged to pivot about fixed pivot points 82 and 84 to drive the braking and movable jaws from their respective retracted position into contact with the blade against the action of respective biasing means in the form of compression springs 86 and 88 to stop further travel of the blade upon the piston rod 28 being linearly driven with operation of the solenoid actuator 16 as described above. As such, differently to the embodiment shown in FIG. 2 wherein the moveable jaw 30 is driven directly into contact with the blade to effect clamping of the blade, in the embodiment shown in FIG. 3 both the braking jaw 34 and the movable jaw 30 are indirectly driven into contact with the blade by the travel of the piston rod 28 via the linkage system 72.

Figure 3:
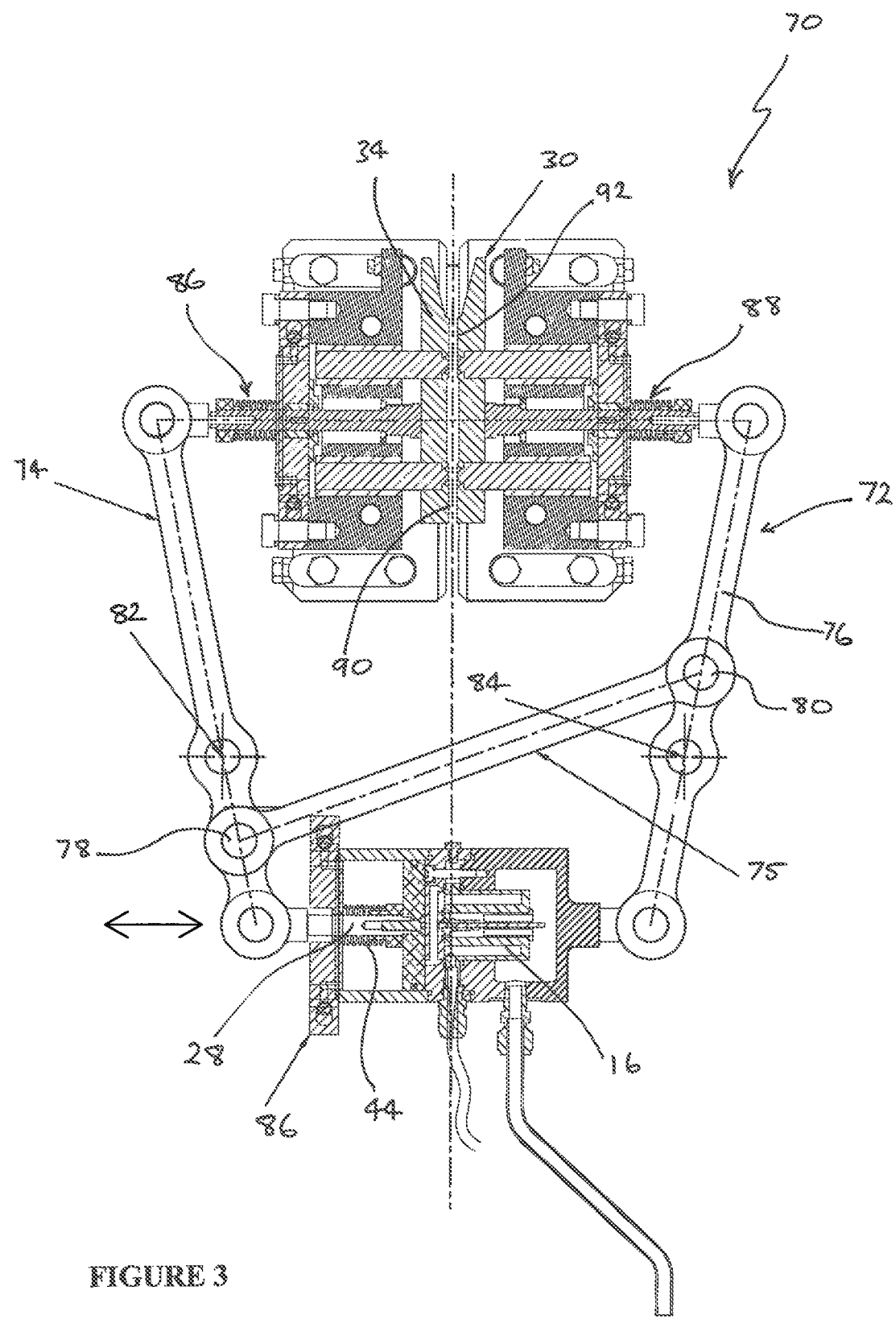
FIG. 3 is a cross-sectional view of another braking apparatus embodied by the invention.

As also shown in FIG. 3, a floating actuator member 86 is mounted to the end of the piston rod 28 and travels linearly with the piston rod against the action of the biasing spring 44. Upon the solenoid actuator 16 being re-energised, the braking jaw 34 and the movable jaw 30 return to their retracted positions under the biasing action of biasing spring 44 and compression springs 86 and 88 to release the blade.

The braking jaw is mounted and arranged in the same manner as the moveable jaw 30 in the embodiment shown in FIG. 3. Differently to the embodiment of FIG. 2, in the embodiment shown in FIG. 3, the moveable and braking jaws 30 and 34 are not profiled to distort the blade sidewardly to effect the clamping of the blade and instead, are provided with substantially flat braking surfaces 90 and 92 along their full length for being driven into contact with the blade of the saw with sufficient force to stop the travel of the blade. In at least some such embodiments, one or both of the flat braking surfaces can be knurled or have other surface deformations for assisting stopping the travel of the blade. In still further embodiments, the braking surfaces can be ribbed wherein the ribs lie transversely with respect to the direction of the blade, or include other protruberances for gripping the blade to stop the blades travel.

Advantageously, in embodiments in which the blade of the saw is not deformed or otherwise bent by the blade being clamped by the braking apparatus 70 the saw may continue to be used without the need to replace the blade, once the blade has been released by the braking apparatus and control systems of the saw for operation of the braking apparatus have been reset.

Figure 4:
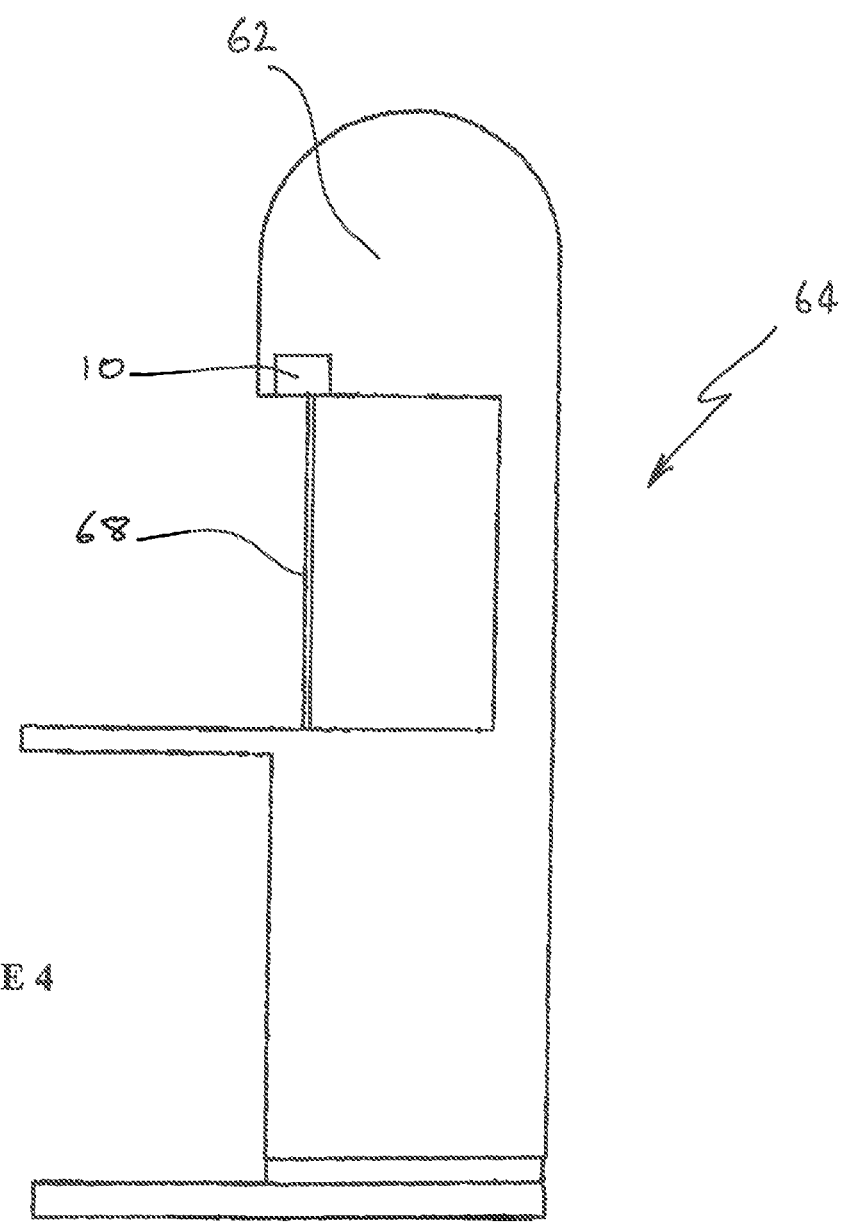
FIG. 4 is a diagrammatic side view of a braking apparatus embodied by the invention mounted to a band saw for processing an animal carcass.

In FIG. 4, an emergency braking apparatus 10 embodied by the invention is shown bolted to the housing 62 of a band saw 64 by bolts 66 ready for use wherein the blade 68 is received in the gap 36 so as to pass between the moveable and braking jaws 30 and 34 of the apparatus (see FIG. 2 and FIG. 3). In the embodiment shown, the band saw 62 is used for the processing of red meat cuts from an animal carcass. However, it will be understood band saws and table mounted circular saws fitted with a clamping apparatus embodied by the invention may be used for other purposes.

An apparatus embodied by the invention can be a pneumatic or hydraulic system and as such the fluid pressurised in the pressure chamber 14 in embodiments described herein may be a suitable inert gas such as air or any suitable conventionally known hydraulic fluid such as a hydraulic oil (e.g., a synthetic oil, a mineral oil or a vegetable oil) or a glycol (e.g., propylene glycol). Typically, the fluid is pressurised to a predetermined operational working pressure for driving the piston rod 28 of the piston 24 against the moveable jaw in a range of from about 1700 kPa to about 2500 kPa and most typically, a pressure of about 2100 kPa.

Advantageously, at least the moveable and braking jaws 30 and 34 of the apparatus 10 are fabricated from a stainless steel or alloy commonly used in food processing equipment and which is suitable for being cleaned with food industry grade chemical cleaning liquids.

Any suitable control system may be employed for controlling the operation of a clamping apparatus embodied by the invention in response to an emergency situation. Conventionally known such control systems that generate an emergency braking signal upon detection of the operator of a band saw or table saw coming into contact with the blade of the saw are, for example, described in International Patent Publication Application No. WO 2007/009172 and U.S. patent application Ser. No. 10/100,211 (US 2002/0170399), the disclosures of both of which are incorporated herein in their entirety by cross-reference.

To further assist in ensuring the travel of the blade is stopped, the control system may be configured to simultaneously operate a conventionally known electric friction brake to halt rotation of the armature of the motor of bandsaw or other electrically powered saw. Alternatively, any suitable electric motor control system may be employed to halt rotation of the armature in combination with the clamping of the blade by an emergency braking apparatus of the invention, such as the application of a DC voltage to the motor (i.e., DC injection braking) or other conventionally known voltage control braking system. In either instance, the braking of the blade by the braking apparatus of the invention may be timed to occur essentially simultaneously with the braking of the armature of the saw motor, or momentarily (e.g., milliseconds) after braking is applied to the armature of the motor in order that the drive force applied to the blade by the motor is reduced when the braking and movable jaws of the braking apparatus of the invention contact the blade.

From the above it will be apparent that a clamping device embodied by the invention may have and/or provide one or more of the following advantages:

Protection of the saw operator against injury from the blade of the saw;
Lessening of the severity of an injury that may otherwise have been suffered by the operator;
Rapid stopping of the blade of the saw in response to the emergency braking signal;
The blade of the saw can be stopped without breakage or shearing of the blade;
An efficient and compact design of the clamping apparatus;
There is no requirement for the rupturing of a fuse for triggering of the apparatus;
The apparatus can be automatically quickly reset; and
The apparatus can be readily fitted to band saw or other saw type.

It will be understood by persons skilled in the art that numerous variations and/or modifications may be made to the invention as broadly described. For example, the movable and braking jaws 30 and 34 may be profiled so as to have different matching profiles than described above for forming a tortuous path for effecting the stopping of the blade when the apparatus is triggered by an emergency braking signal in use. For instance, one of the movable and braking jaws 30 and 34 may be profiled to have a plurality of raised portions and the other of the movable and braking jaws may have corresponding recesses aligned with those raised portions. Likewise, other solenoid actuator arrangements and/or pressurised fluid flow paths may also be employed. Moreover, whilst a braking apparatus as described herein may be provided on a band saw or other saw type utilised with a cutting table for the processing of animal carcasses or meat cuts, the invention is not limited thereto. Indeed, a saw provided with a braking apparatus in accordance with the invention may be utilised for the cutting of other items such as, but not limited to other food inputs, or bars, rods, planks or tubing made of metal, wood or a plastics material.

The above describe embodiments are, therefore, to be considered in all respects as illustrative and not restrictive.

The invention claimed is:

1. An emergency braking apparatus for stopping travel of the blade of an electrically powered saw of the type incorporating a cutting table through which the blade of the saw passes during a cutting operation, the apparatus comprising:
   a braking jaw;
   a movable jaw spaced apart from the braking jaw for reception of the blade of the saw between the braking jaw and the movable jaw;
   a driver for driving the movable jaw from a retracted position into contact with a side face of the blade to force an opposite side the blade against the braking jaw and thereby clamp the blade between the braking jaw and the movable jaw;
   a piston cylinder in which at least a portion of the driver is slidably arranged;
   a pressure chamber for holding a fluid at a predetermined pressure;
   an actuator operable in response to an emergency braking signal to release the pressurised fluid in the pressure chamber to drive the driver against the movable jaw for driving the movable jaw into said contact with the side face of the blade;
   a pressure chamber housing, mounted to the piston cylinder, and defining the pressure chamber, wherein the pressure chamber houses the actuator; and
   a discharge port for directing pressurized fluid from the pressure chamber into the driver, the discharge port comprising an opening between the actuator housing and the piston cylinder; and
   wherein the driver is coupled to the pressure chamber via the actuator and the discharge port.

2. A braking apparatus according to claim 1, wherein the moveable jaw and the braking jaw are profiled to distort a section of the blade between the movable jaw and the braking jaw sidewardly with respect to a longitudinal axis of the blade to effect the clamping of the blade.

3. A braking apparatus according to claim 2, wherein one of the moveable jaw and the braking jaw has a recessed portion and the other of the moveable jaw and the braking jaw has a protruding portion, and the moveable jaw is arranged to align the protruding portion and the recessed portion for the sideward distortion of the section of the blade.

4. A braking apparatus according claim 1, wherein the actuator is a solenoid actuator operable to release the pressurised fluid from the pressure chamber.

5. A braking apparatus according to claim 4, wherein the solenoid actuator is a solenoid valve comprising a solenoid body and a valve member, and the solenoid is operable in response to the emergency braking signal to release the valve member for release of the pressurised fluid from the pressure chamber.

6. A braking apparatus according to claim 5, wherein the valve member is a valve being arranged to control flow of the pressurised fluid from the pressure chamber to the discharge port.

7. A braking apparatus according to claim 1, wherein the driver is arranged for being linearly driven by the pressurised fluid from a resting position to a working position in which the moveable jaw is pressed against the side face of the blade.

8. A braking apparatus according to claim 1, wherein the driver comprises a piston having a piston head and a piston rod, and the apparatus further comprises a fluid flow path for directing the pressurised fluid into contact with the piston head to drive the piston rod into the working position.

9. A braking apparatus according to claim 8, wherein the movable jaw is arranged to be moved into contact with the blade with travel of the piston rod into the working position.

10. A braking apparatus according to claim 8, wherein the piston cylinder comprises a cylinder in which the piston head of the piston is disposed, and the piston rod of the piston projects from the cylinder to drive the clamping of the blade by the braking jaw and the movable jaw.

11. A braking apparatus according to claim 10, wherein the piston rod of the piston projects from the cylinder and bears against the movable jaw.

12. A braking apparatus according to claim 11, further comprising:
    a guide housing into which the piston rod projects from the cylinder; and
    at least one guide rod for guiding movement of the moveable jaw into contact with the side face of the blade, the one or more guide rods being slidably received by the guide housing.

13. A braking apparatus according to claim 10, further comprising biasing means arranged in the cylinder to bias the piston for return to the retracted position from the working position of the piston upon the pressurised fluid being vented from acting on the driver.

14. A braking apparatus according to claim 1, wherein the braking jaw is a stationary jaw retained in a fixed in position.

15. A braking apparatus according to claim 1, wherein the braking jaw is movable, and the braking jaw and the movable jaw are arranged to be driven into contact with the blade by the driver upon the operation of the actuator in response to the emergency braking signal.

16. An electrically powered saw of the type incorporating a cutting table through which the blade of the saw passes during a cutting operation, the saw including an emergency braking apparatus as defined claim 1, wherein the apparatus is arranged to clamp the blade when triggered by the emergency stopping signal.

17. A method for the emergency braking of a blade of an electrically powered saw of the type incorporating a cutting table through which the blade of the saw passes during a cutting operation, the method comprising:
    providing a braking apparatus comprising a braking jaw and a movable jaw spaced apart from the braking jaw, the blade of the saw passing between the braking jaw and the movable jaw, and the apparatus further including a driver for driving the movable jaw from a retracted position into contact with a side face of the blade to force an opposite side the blade against the braking jaw and thereby clamp the blade between the braking jaw and the movable jaw, a piston cylinder in which at least a portion of the driver is slidably arranged, a pressure chamber for holding a fluid at a predetermined pressure, and an actuator operable to release the pressurised fluid from the pressure chamber through a discharge port to the driver, a pressure chamber housing mounted to the piston cylinder and defining the pressure chamber, wherein the pressure chamber houses the actuator, wherein the driver is coupled to the pressure chamber via the actuator and the discharge port, and wherein the discharge port comprises an opening between the actuator housing and the piston cylinder; and
    operating the actuator in response to an emergency braking signal to release the pressurised fluid in the pressure chamber to drive the driver against the movable jaw and so drive the movable jaw into said contact with the side face of the blade to brake the blade.

18. A method according to claim 17, wherein braking jaw is a stationary jaw retained in a fixed in position.

19. A method according to claim 18, wherein the braking jaw is movable, and the braking jaw and the movable jaw are arranged to be driven into contact with the blade by the driver upon the operation of the actuator in response to the emergency braking signal.

20. A saw apparatus comprising:
    an electrically powered saw, including a blade;
    a cutting table through which the blade of the saw passes during a cutting operation;
    a braking jaw;
    a movable jaw spaced apart from the braking jaw for reception of the blade of the saw between the braking jaw and the movable jaw;
    a driver for driving the movable jaw from a retracted position into contact with a side face of the blade to force an opposite side the blade against the braking jaw and thereby clamp the blade between the braking jaw and the movable jaw;
    a piston cylinder in which at least a portion of the driver is slidably arranged; a pressure chamber for holding a fluid at a predetermined pressure; an actuator operable in response to an emergency braking signal to release the pressurised fluid in the pressure chamber to drive the driver against the movable jaw for driving the movable jaw into said contact with the side face of the blade;
    a pressure chamber housing, mounted to the piston cylinder, and defining the pressure chamber, wherein the pressure chamber houses the actuator; and
    a discharge port for directing pressurized fluid from the pressure chamber into the driver, the discharge port comprising an opening between the actuator housing and the piston cylinder; and
    wherein the driver is coupled to the pressure chamber via the actuator and the discharge port.

* * * * *